United States Patent
Lin et al.

(10) Patent No.: US 11,610,391 B2
(45) Date of Patent: Mar. 21, 2023

(54) CROSS-DOMAIN IMAGE COMPARISON METHOD AND SYSTEM USING SEMANTIC SEGMENTATION

(71) Applicant: INDUSTRIAL TECHNOLOGY RESEARCH INSTITUTE, Hsinchu (TW)

(72) Inventors: Feng-Sheng Lin, Zhubei (TW); Chu-Fang Wang, Taipei (TW); Ruen-Rone Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 199 days.

(21) Appl. No.: 16/730,145

(22) Filed: Dec. 30, 2019

(65) Prior Publication Data

US 2021/0201093 A1    Jul. 1, 2021

(51) Int. Cl.
G06V 10/75    (2022.01)
G06V 20/10    (2022.01)
G06V 20/40    (2022.01)

(52) U.S. Cl.
CPC ............ G06V 10/75 (2022.01); G06V 20/10 (2022.01); G06V 20/41 (2022.01)

(58) Field of Classification Search
None
See application file for complete search history.

(56) References Cited

U.S. PATENT DOCUMENTS

| 7,702,185 B2 * | 4/2010 | Keating ............... G06F 16/583 |
| | | 382/305 |
| 8,532,396 B2 | 9/2013 | Rezazadeh et al. |
| 8,712,156 B2 | 4/2014 | Bronstein et al. |
| 9,008,424 B2 | 4/2015 | Cordara et al. |
| 2005/0002568 A1 | 1/2005 | Chupeau et al. |

(Continued)

FOREIGN PATENT DOCUMENTS

| CN | 103218810 A | 7/2013 |
| CN | 105857547 A | 6/2016 |

(Continued)

OTHER PUBLICATIONS

Li et al., "A Novel Visual-Vocabulary-Translator-Based Cross-Domain Image Matching", IEEE Access, vol. 5, 2017, pp. 23190-23203.

Lin et al., "Cross-Domain Visual Matching via Generalized Similarity Measure and Feature Learning", IEEE Transactions on Pattern Analysis and Machine Intelligence, vol. 39, No. 6, Jun. 2017, pp. 1089-1102.

(Continued)

Primary Examiner — Tahmina N Ansari
(74) Attorney, Agent, or Firm — Birch, Stewart, Kolasch & Birch, LLP

(57) ABSTRACT

A cross-domain image comparison method and a cross-domain image comparison system are provided. The cross-domain image comparison method includes the following steps. Two videos in cross-domain are obtained. The videos are generated by different types of devices. A plurality of semantic segmentation areas are obtained from one frame of each of the videos. A region of interest pair (ROI pair) is obtained according to moving paths of the semantic segmentation areas in the videos. Two bounding boxes and two central points of the ROI pair are obtained. A similarity between the frames is obtained according to the bounding boxes and the central points.

20 Claims, 9 Drawing Sheets

(56) References Cited

U.S. PATENT DOCUMENTS

| | | | | |
|---|---|---|---|---|
| 2016/0379055 A1* | 12/2016 | Loui | .................... | G06K 9/6224 |
| | | | | 382/103 |
| 2018/0025622 A1 | 1/2018 | Lindoff et al. | | |
| 2020/0174490 A1* | 6/2020 | Ogale | .................. | G05D 1/0221 |
| 2020/0202615 A1* | 6/2020 | Kwon | .................... | G06T 11/20 |

FOREIGN PATENT DOCUMENTS

| | | |
|---|---|---|
| CN | 106203242 A | 12/2016 |
| CN | 107092870 A | 8/2017 |
| CN | 109670555 A | 4/2019 |
| TW | 201118763 A1 | 6/2011 |
| TW | 201933182 A | 8/2019 |
| WO | WO 2015/196937 A1 | 12/2015 |

OTHER PUBLICATIONS

Melo et al., "Cross-domain image matching improved by visual attention", Journal of VSCG, ISSN 1213-6972, vol. 22, 2014, pp. 65-72.

Shrivastava et al., "Data-driven Visual Similarity for Cross-domain Image Matching", SA '11: Proceedings of the 2011 SIGGRAPH Asia Conference, Article No. 154, Dec. 2011, pp. 1-9.

Xu et al., "Cross-Paced Representation Learning With Partial Curricula for Sketch-Based Image Retrieval", IEEE Transactions on Image Processing, vol. 27, No. 9, Sep. 2018, pp. 4410-4421.

Zhang et al., "Sketch-Based Cross-Domain Image Retrieval via Heterogeneous Network", VCIP 2017, Dec. 10-13, 2017, pp. 1-4.

Taiwanese Office Action and Search Report, dated Dec. 31, 2020, for Taiwanese Application No. 109103872.

* cited by examiner

CROSS-DOMAIN IMAGE COMPARISON METHOD AND SYSTEM USING SEMANTIC SEGMENTATION

TECHNICAL FIELD

The disclosure relates in general to a cross-domain image comparison method and a cross-domain image comparison system.

BACKGROUND

In recent years, self-driving cars have accidents on the road. Therefore, various driving simulation tests before self-driving cars are very important. In particular, some accident videos are used to predict the self-driving response capability. If a real vehicle crash is used to produce the real accident video, it must inevitably require a relatively high cost. Computer graphics are useful to assist the production of similar accident videos and has become a good alternative.

However, how high the confidence of the synthesized accident video generated by computer is an important factor for the success of the driving simulation test. The synthesized accident video and the real accident video must have a certain level of similarity. The synthesized accident video and the real accident video are generated by different devices. That is to say, the synthesized accident video and the real accident video are cross-domain. The synthesized accident video and the pixels in the real accident video are quite different in pixel level, and it is difficult to be compared. Traditional comparison method cannot obtain the similarity between the synthesized accident video and the real accident video. Therefore, researchers are working on developing a cross-domain image comparison method to assist the self-driving simulation test, or other applications.

SUMMARY

The disclosure is directed to a cross-domain image comparison method and a cross-domain image comparison system.

According to one embodiment, a cross-domain image comparison method includes the following steps. Two videos in cross-domain are obtained. The videos are generated by different types of devices. A plurality of semantic segmentation areas are obtained from one frame of each of the videos. A region of interest pair (ROI pair) is obtained according to moving paths of the semantic segmentation areas in the videos. Two bounding boxes and two central points of the ROI pair are obtained. A similarity between the frames is obtained according to the bounding boxes and the central points.

According to another embodiment, a cross-domain image comparison system is provided. The cross-domain image comparison system includes an inputting unit, a semantic segmentation unit, a ROI unit, a bounding box unit and a similarity unit. The inputting unit is used for obtaining two videos in cross-domain. The videos are generated by different types of devices. The semantic segmentation unit is used for obtaining a plurality of semantic segmentation areas from one frame of each of the videos. The ROI unit is used for obtaining a region of interest pair (ROI pair) according to moving paths of the semantic segmentation areas in the videos. The bounding box unit is used for obtaining two bounding boxes and two central points of the ROI pair. The similarity unit is used for obtaining a similarity between the frames according to the bounding boxes and the central points.

Figure 1:
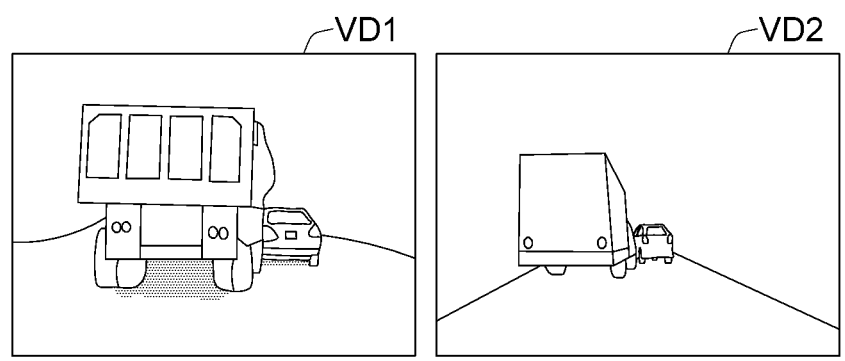
FIG. 1 shows two videos in cross-domain according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows two videos VD1, VD2 in cross-domain according to one embodiment. "cross-domain" means that the two videos are generated by different devices. The video VD1 may be an real accident video, an real driving video, an real dance video, or an real gymnastics video captured by a camera. The video VD2 may be a synthesized accident video, a synthesized driving video, a synthesized dance video, or a synthesized gymnastics video generated by a computer. The synthesized accident video, the synthesized driving video, the synthesized dance video and the synthesized gymnastics video contribute to the establishment of an accident training model, a travel training model, a dance training model and a gymnastic training model respectively. However, for increasing the reliability of the training model, the synthesized video and the real video must reach a certain level of similarity.

Figure 2:
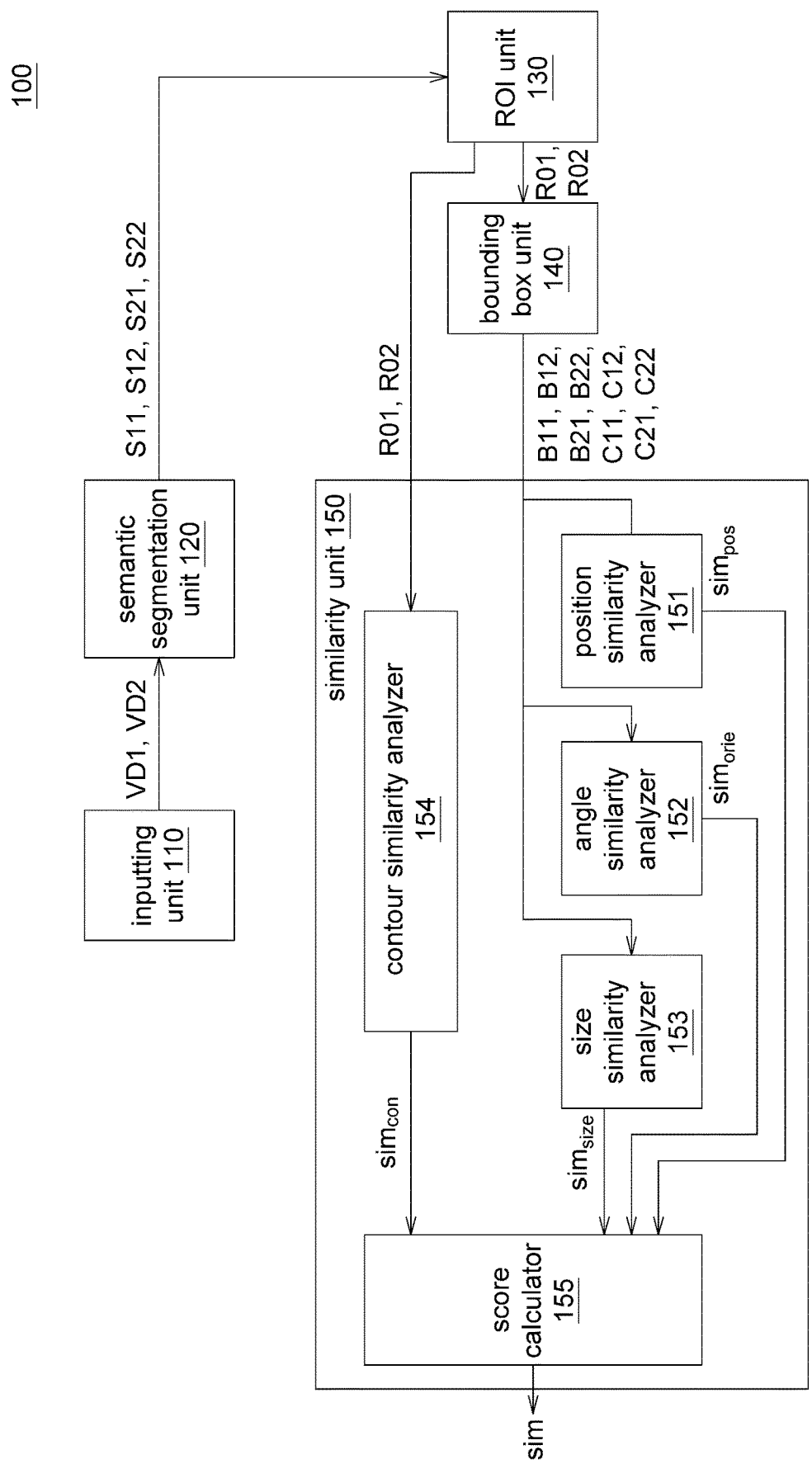
FIG. 2 shows a cross-domain image comparison system according to one embodiment.

Please refer to FIG. 2, which shows a cross-domain image comparison system 100 according to one embodiment. The cross-domain image comparison system 100 includes an inputting unit 110, a semantic segmentation unit 120, a ROI unit 130, a bounding box unit 140 and a similarity unit 150. The inputting unit 110 may be a wireless transmission device, a transmission cable, a memory card or a hard disk. Each of the semantic segmentation unit 120, the ROI unit 130, the bounding box unit 140 and the similarity unit 150 may be a circuit, a chip, a circuit board, a plurality of program codes or a storage device storing the program codes. The cross-domain image comparison system 100 applies the semantic segmentation technology to reduce the complexity of the videos VD1, VD2, and analyzes a region of interest pair (ROI pair) to obtain a similarity. As such, the similarity between the video VD1 and the video VD2 in cross-domain can be obtained to assist the application of the self-driving simulation, the dance training or the gymnastic training. The operation of those elements is illustrated via a flowchart.

Figure 3:
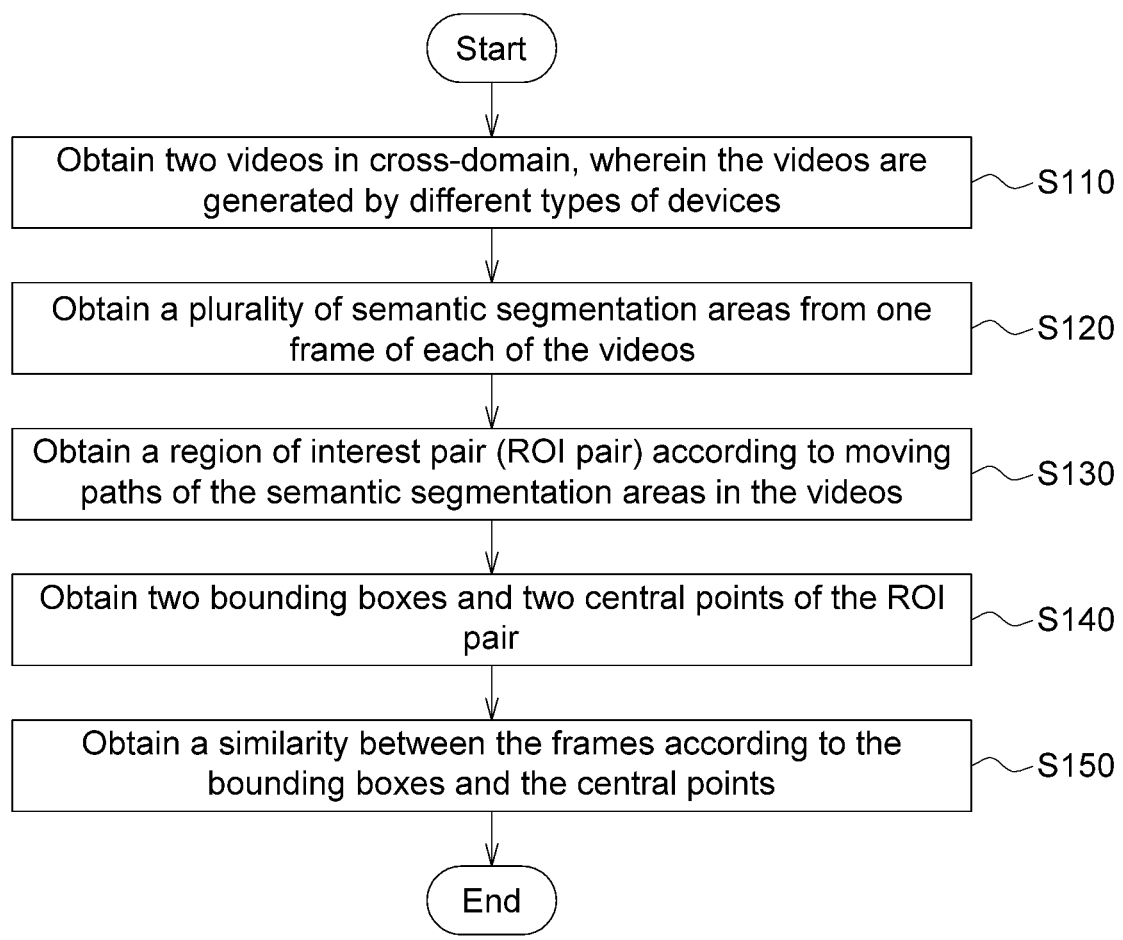
FIG. 3 shows a flowchart of a cross-domain image comparison method according to one embodiment.
Figure 4:
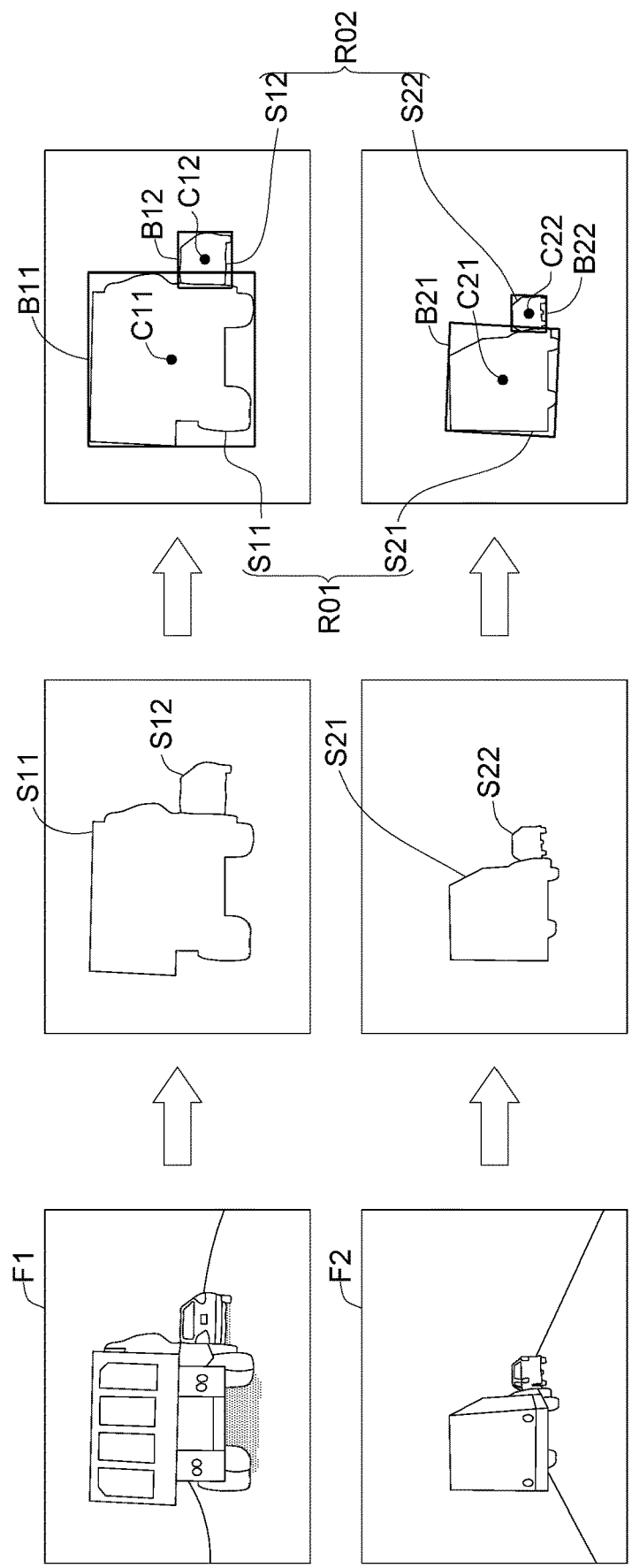
FIG. 4 illustrates the steps in the FIG. 3.

Please refer to FIGS. 3 to 4. FIG. 3 shows a flowchart of the cross-domain image comparison method according to one embodiment. FIG. 4 illustrates the steps in the FIG. 3. In the step S110, the inputting unit 110 obtains the videos VD1, VD2 in cross-domain. As shown in FIG. 1, the video VD1 may be captured by a camera, the video VD2 may be generated by a computer. The video VD1 is composed of a plurality of frames, and the video VD2 is also composed of a plurality of frames. Some objects and background are shown in the frames. To compare the video VD1 and the video VD2, the objects in the video VD1 and the video VD2 are paired. The paired objects can be compared to obtain the similarity between one frame in the video VD1 and one frame in the video VD2.

Next, in the step S120, the semantic segmentation unit 120 obtains a plurality of semantic segmentation areas S11, S12, S21, S22 from the frames F1, F2 of the videos VD1, VD2. As shown in FIG. 4, the frame F1 of the video VD1 has the semantic segmentation areas S11, S12; the frame F2 of the video VD2 has the semantic segmentation areas S21, S22. The semantic segmentation technology is used to classify the pixels in the frame to segment the objects. The semantic segmentation unit 120 obtains the semantic segmentation areas S11, S12, S21, S22 via a semantic segmentation model. For example, the semantic segmentation model may be a Fully Convolutional Networks model (FCN model), an U-net model or an efficient neural network model (Enet model). In this step, the pairing relationships among the semantic segmentation areas S11, S12, S21, S22 are not known yet.

Then, in the step S130, the ROI unit 130 obtains regions of interest pair (ROI pair) R01, R02 according to moving paths of the semantic segmentation areas S11, S12, S21, S22 in the videos VD1, VD2. The semantic segmentation areas S11, S12 corresponding the ROI pair R01 are obtained from the different videos VD1, VD2. The semantic segmentation areas S21, S22 corresponding the ROI pair R02 are obtained from the different videos VD1, VD2. As shown in FIG. 4, according to the moving path of the semantic segmentation area S11 in the video VD1 and the moving path of the semantic segmentation area S21 in the video VD2, the ROI unit 130 finds that the moving path of the semantic segmentation area S11 and the moving path of the semantic segmentation area S21 are similar. The semantic segmentation area S11 and the semantic segmentation area S21 are deemed as an identical object, so the semantic segmentation area S11 and the semantic segmentation area S21 are linked to be the ROI pair R01.

According to the moving path of the semantic segmentation area S12 in the video VD1 and the moving path of the semantic segmentation area S22 in the video VD2, the ROI unit 130 finds that the moving path of the semantic segmentation area S12 and the moving of the semantic segmentation area S22 are similar. The semantic segmentation area S12 and the semantic segmentation area S22 are deemed as another identical object, so the semantic segmentation area S12 and the semantic segmentation area S22 are linked to be the ROI pair R02. After obtaining the ROI pair R01, the ROI pair R01 can be analyzed to obtain the similarity between the frame F1 and the frame F2. Similarly, after obtaining the ROI pair R02, the ROI pair R02 can be analyzed to obtain the similarity between the frame F1 and the frame F2. If the similarity between the semantic segmentation area S11 and the semantic segmentation area S21 in the ROI pair R01 is high, then it can be inferred that the frame F1 and the frame F2 have high similarity; if the similarity between the semantic segmentation area S12 and the semantic segmentation area S22 in the ROI pair R02 is high, then it can be inferred that the frame F1 and the frame F2 have high similarity.

Afterwards, in the step S140, the bounding box unit 140 obtains bounding boxes B11, B12, B21, B22 and central points C11, C12, C21, C22 of the ROI pairs R01, R02. As shown in FIG. 4, the bounding box unit 140 obtains the two bounding boxes B11, B21 and the two central points C11, C21 of the ROI pair R01, and obtains the two bounding boxes B12, B22 and the central points C12, C22 of the ROI pair R02. For example, each of the bounding boxes B11, B12, B21, B22 may be an oriented bounding box (OBB). The oriented bounding box is the minimum bounding box based on the calculation on all directions of the coordinate system.

For example, the central points C11, C12, C21, C22 may be the intersections of diagonal lines of the bounding boxes B11, B12, B21, B22 respectively. So far, the cross-domain image comparison system 100 already obtains the counters, the bounding boxes B11, B12, B21, B22 and the central points C11, C12, C21, C22 of the semantic segmentation areas S11, S12, S21, S22 in the ROI pairs R01, R02. According to the above mentioned information, the similarity between the frame F1 and the frame F2 can be obtained in the following steps.

Then, in the step S150, the similarity unit 150 obtains the similarity between the frame F1 and the frame F2 at least according to the bounding boxes B11, B12, B21, B22 and the central points C11, C12, C21, C22. As shown in FIG. 2, the similarity unit 150 includes a position similarity analyzer 151, an angle similarity analyzer 152, a size similarity analyzer 153, a contour similarity analyzer 154 and a score calculator 155. Each of the position similarity analyzer 151, the angle similarity analyzer 152, the size similarity analyzer 153, the contour similarity analyzer 154 and the score calculator 155 may be a circuit, a chip, a circuit board, a plurality of program codes, or a storage device storing the program codes. The similarity unit 150 may perform various similarity analyzing procedures by those elements to obtain the similarity of the frame F1 and the frame F2. The operation of those elements is illustrated via a flowchart.

Figure 5:
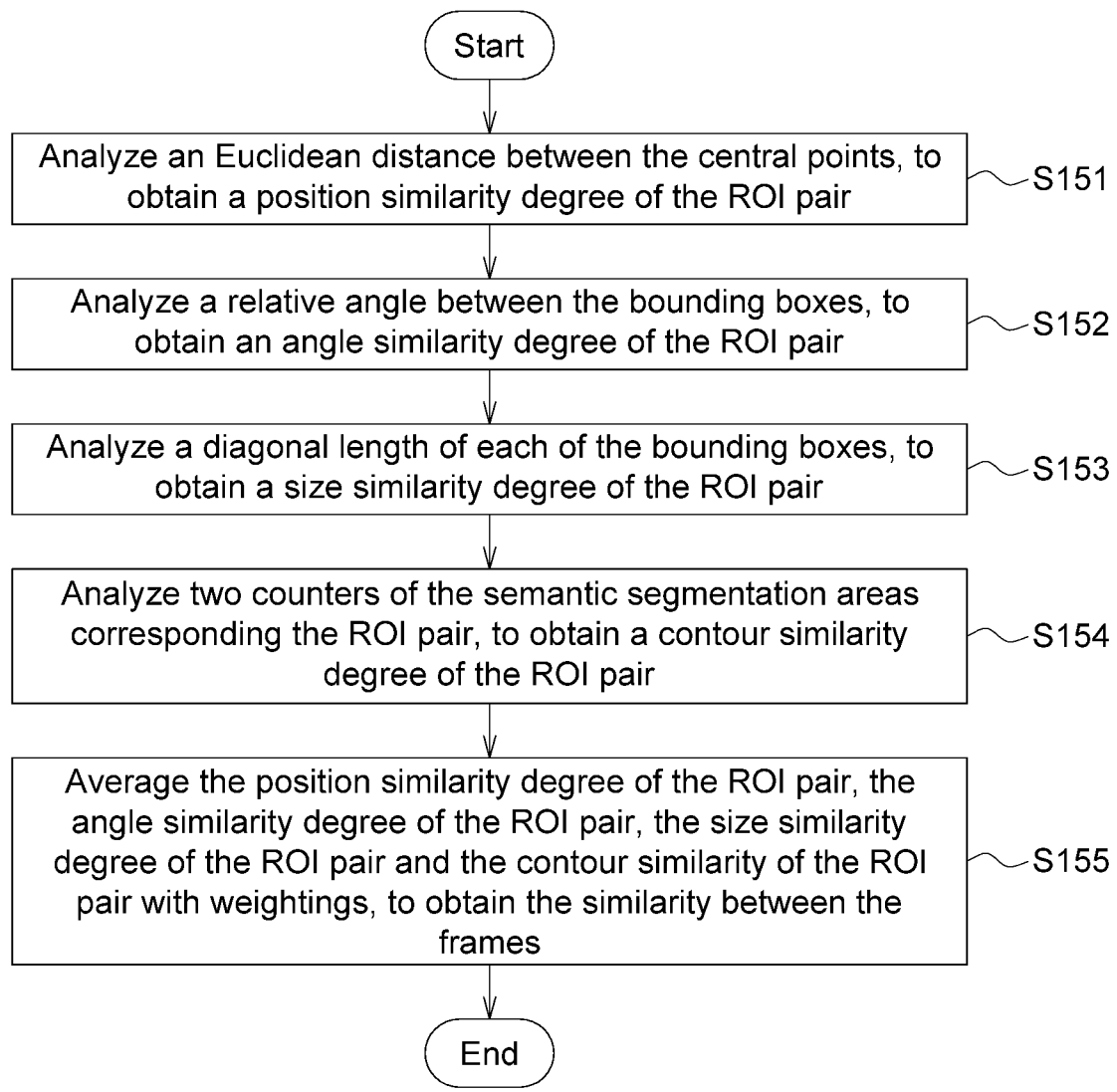
FIG. 5 shows a detailed flow chart of the step S150 according to one embodiment.

Please refer to FIG. 5, which shows a detailed flow chart of the step S150 according to one embodiment. The step S150 includes steps S151 to S155. The sequence of the steps S151 to S154 can be changed. In one embodiment, the steps S151 to S154 can be performed at the same time. The sequence of the steps S151 to S154 is not used to limit the present disclosure.

Figure 6:
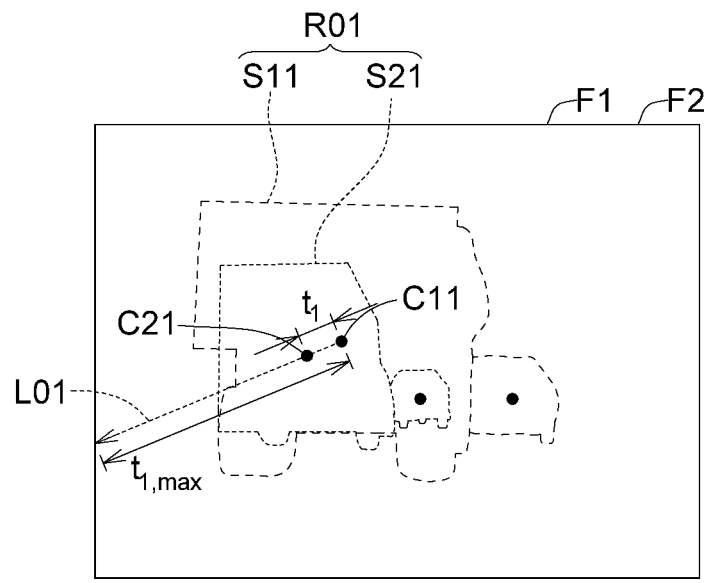
FIGS. 6 to 7 illustrate the step S151 according to one embodiment.
Figure 7:
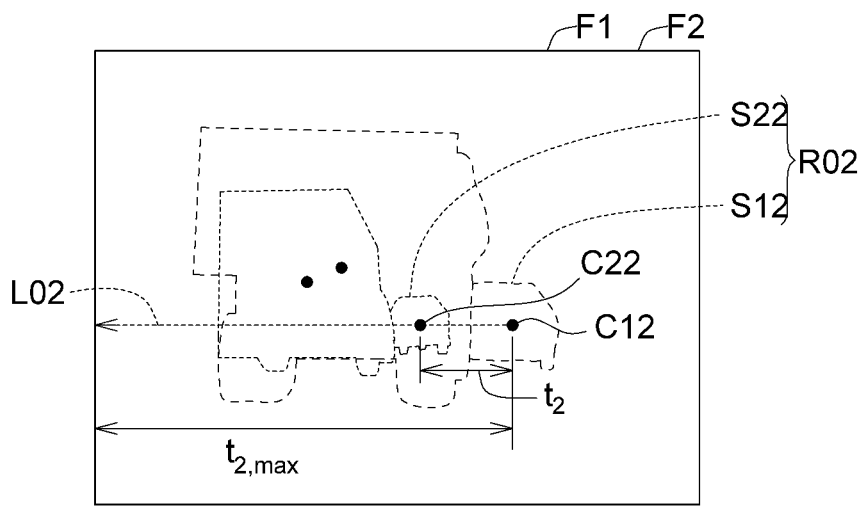

Please refer to FIGS. 6 to 7, which illustrate the step S151 according to one embodiment. In the step S151, the position similarity analyzer 151 analyzes the Euclidean distances among the central points C11, C12, C21, C22 to obtain a position similarity degree $sim_{pos}$ of the ROI pairs R01, R02. As shown in FIG. 6, the position similarity analyzer 151 overlaps the border of the frame F1 and the border of the frame F2, and draws a connecting line L01 along the central point C11 and the central point C21. The position similarity analyzer 151 further obtains the Euclidean distance $t_1$ between the central point C11 and the central point C21 and the maximum distance $t_{1,max}$ from the central point C11 or the central point C21 to the borders of the frames F1, F2. The maximum distance $t_{1,max}$ is measured along the connecting line L01 connecting the central point C11 and the central point C21.

As shown in FIG. 7, the position similarity analyzer 151 overlaps the board of the frame F1 and the board of the frame F2, and draws a connecting line L02 along the central point C12 and the central point C22. The position similarity analyzer 151 further obtains the Euclidean distance $t_2$ between the central point C12 and the central point C22 and the maximum distance $t_{2,max}$ from the central point C12 or the central point C22 to the borders of the frames F1, F2. The maximum distance $t_{2,max}$ is measured along the connecting line L02 connecting the central point C12 and the central point C22.

The position similarity analyzer 151 obtains the position similarity degree $sim_{pos}$ of the ROI pair R01 and the ROI pair R02 according to the above information. The position similarity degree $sim_{pos}$ may be calculated according to the following equation (1).

$$sim_{pos} = \left( \sum_{i=1 \text{ to } |ROI \text{ pair}|} \frac{t_{i,max} - t_i}{t_{i,max}} \right) / |ROI \text{ pair}| \quad (1)$$

|ROI pair| is the number of the ROI pairs R01, R02. In this case, the number of the ROI pairs R01, R02 is 2. That is to say, if the central point C11 is close to the central point C21, and the central point C12 is close to the central point C22, the position similarity degree $sim_{pos}$ will approach to 1. On the contrary, if the central point C11 is far from the central point C21, and the central point C12 is far from the central point C22, the position similarity degree $sim_{pos}$ will approach to 0.

Figure 8:
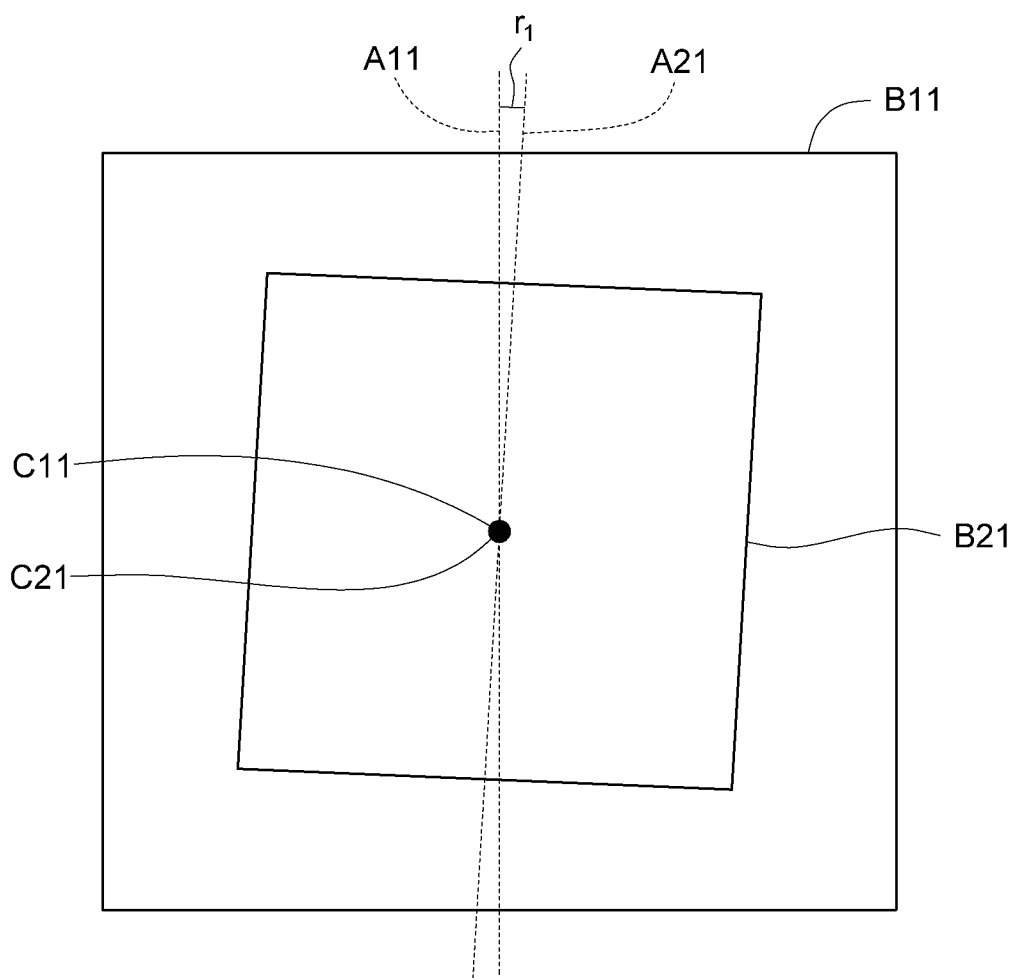
FIGS. 8 to 9 illustrate the S152 according to one embodiment.
Figure 9:
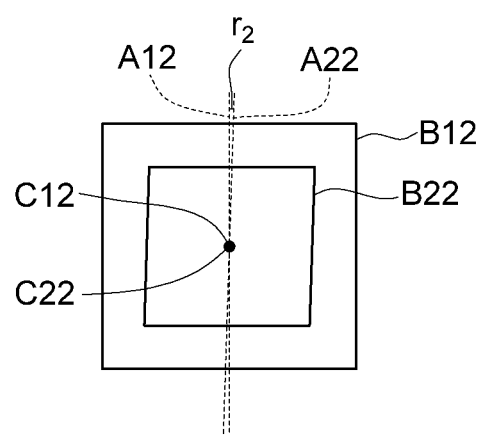

Please refer to FIGS. 8 to 9, which illustrate the S152 according to one embodiment. In the step S152, the angle similarity analyzer 152 analyzes relative angles of the bounding boxes B11, B12, B21, B22 to obtain an angle similarity degree $sim_{orie}$ of the ROI pairs R01, R02. As shown in FIG. 8, the angle similarity analyzer 152 aligns the central point C11 and the central point C21 to overlap the bounding box B11 and the bounding box B21. Then, the angle similarity analyzer 152 obtains the relative angle $r_1$ between a central axis A11 of the bounding box B11 and a central axis A21 of the bounding box B21.

As shown in FIG. 9, the angle similarity analyzer 152 aligns the central point C12 and the central point C22 to overlaps the bounding box B12 and the bounding box B22. Then, the angle similarity analyzer 152 obtains the relative angle $r_2$ between a central axis A12 of the bounding box B12 and a central axis A22 of the bounding box B22.

The angle similarity analyzer 152 obtains the angle similarity degree $sim_{orie}$ of the ROI pair R01 and the ROI pair R02 according to the relative angles $r_1$, $r_2$. The angle similarity degree $sim_{orie}$ may be calculated according to the following equation (2).

$$sim_{orie} = \left( \sum_{i=1 \text{ to } |ROI \text{ pair}|} \frac{180° - r_i}{180°} \right) / |ROI \text{ pair}| \quad (2)$$

That is to say, if the degree of inclination of the bounding box B11 is close to that of the bounding box B21 and the degree of inclination of bounding box B12 is close to that of the bounding box B22, the angle similarity degree $sim_{orie}$ will approach to 1. On the contrary, if the degree of inclination of the bounding box B11 is far from that of the bounding box B21 and the degree of inclination of the bounding box B12 is far from that of the bounding box B22, the angle similarity degree $sim_{orie}$ will approach to 0.

Figure 10:
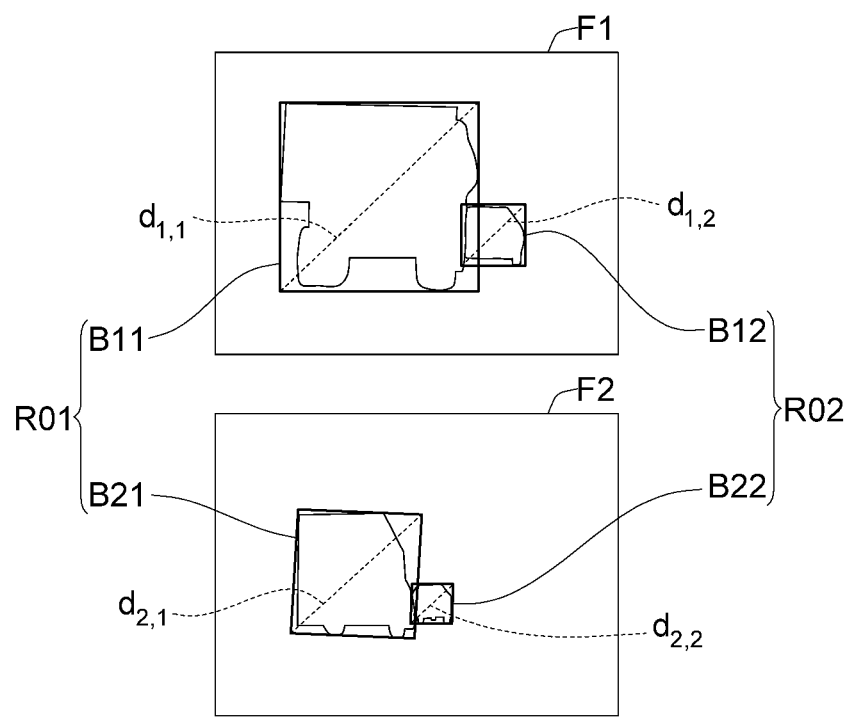
FIG. 10 illustrates the step S153 according to one embodiment.

Refer to FIG. 10, which illustrates the step S153 according to one embodiment. In the step S153, the size similarity analyzer 153 analyzes diagonal length $d_{1,1}$, $d_{1,2}$, $d_{2,1}$, $d_{2,2}$ of the bounding boxes B11, B12, B21, B22 to obtain a size similarity degree $sim_{size}$ of the ROI pairs R01, R02. As shown in FIG. 10, the bounding box B11 of the ROI pair R01 has the diagonal length $d_{1,1}$, the bounding box B21 of the ROI pair R01 has the diagonal length $d_{2,1}$, the bounding box B12 of the ROI pair R02 has the diagonal length $d_{1,2}$, and the bounding box B22 of the ROI pair R02 has the diagonal length $d_{2,2}$.

The size similarity analyzer 153 obtains the size similarity degree $sim_{size}$ of the ROI pair R01 and the ROI pair R02 according to the diagonal lengths $d_{1,1}$, $d_{1,2}$, $d_{2,1}$, $d_{2,2}$. The size similarity degree $sim_{size}$ may be calculated according to the following equation (3).

$$sim_{size} = \left( \sum_{i=1 \text{ to } |ROI \text{ pair}|} \frac{\min(d_{1,i}, d_{2,i})}{\max(d_{1,i}, d_{2,i})} \right) / |ROI \text{ pair}| \quad (3)$$

That is to say, if the size of the bounding box B11 is close to the size of the bounding box B21 and the size of the bounding box B12 is close to the size of the bounding box B22, the size similarity degree $sim_{size}$ will approach to 1. On the contrary, if the size of the bounding box B11 is far from the size of the bounding box B21 and the size of the bounding box B12 is far from the size of the bounding box B22, the size similarity degree $sim_{size}$ will approach to 0.

Figure 11:
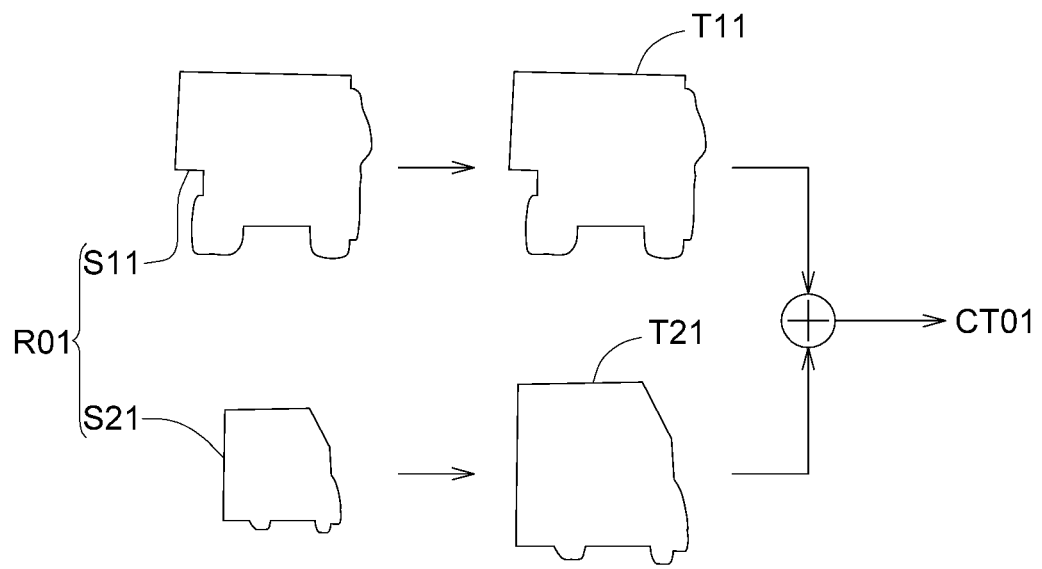
FIGS. 11 to 12 illustrate the step S154 according to one embodiment.
Figure 12:
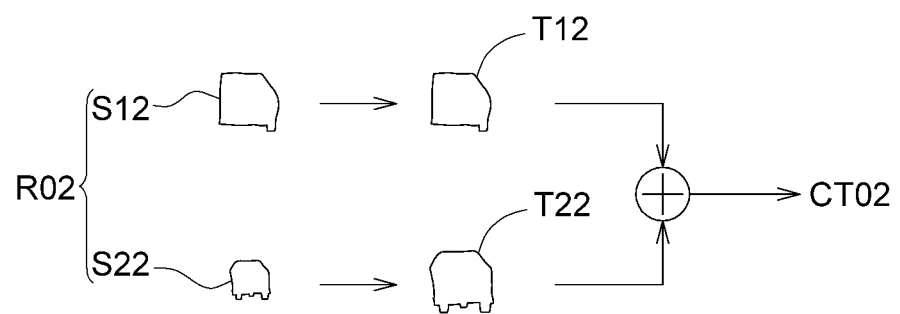

Please refer to FIGS. 11 to 12, which illustrate the step S154 according to one embodiment. In the step S154, the contour similarity analyzer 154 analyzes counters of the semantic segmentation areas S11, S12, S21, S22 of the ROI pairs R01, R02 to obtain a contour similarity degree $sim_{con}$ of the ROI pairs R01, R02. As shown in FIG. 11, the contour similarity analyzer 154 resizes the counter of the semantic segmentation areas S11 and the counter of the semantic segmentation areas S21 in the ROI pair R01 to be a counter T11 and a counter T21 which have identical size. Then, the contour similarity analyzer 154 obtains a contour similarity CT01 between the counter T11 and the counter T21.

As shown in FIG. 12, the contour similarity analyzer 154 resizes the counter of the semantic segmentation areas S12 and the counter of the semantic segmentation areas S22 in the ROI pair R02 to be a counter T12 and a counter T22 which have identical size. Then, the contour similarity analyzer 154 obtains a contour similarity CT02 between the counter T12 and the counter T22. Next, the contour similarity analyzer 154 obtains the contour similarity degree $sim_{con}$ (shown in FIG. 2) according to the contour similarity CT01 and the contour similarity CT02.

Afterwards, the process proceeds to the step S155. As shown in FIG. 2, the score calculator 155 averages the position similarity degree $sim_{pos}$, the angle similarity degree $sim_{orie}$, the size similarity degree $sim_{size}$ and the contour similarity degree $sim_{con}$ of the ROI pairs R01, R02 to obtain the similarity sim between the frame F1 and the frame F2.

According to the embodiments described above, the cross-domain image comparison system 100 and the cross-domain image comparison method apply the semantic segmentation technology to reduce the complexity of the videos in cross-domain, and analyzes the ROI pairs to obtain the similarity. As such, the similarity between the videos and the video in cross-domain can be obtained to assist the application of the self-driving simulation, the dance training or the gymnastic training. The operation of those elements is illustrated via a flowchart.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A cross-domain image comparison method, comprising:
obtaining two videos in cross-domain, wherein the videos are generated by different types of devices;
obtaining a plurality of semantic segmentation areas from one frame of each of the videos;
obtaining a region of interest pair (ROI pair) according to moving paths of the semantic segmentation areas in the videos;
obtaining two bounding boxes and two central points of the bounding boxes, wherein each of the two bounding boxes surrounds one of the semantic segmentation areas; and
obtaining a similarity between the frames according to the bounding boxes and the central points.

2. The cross-domain image comparison method according to claim 1, wherein one of the videos is captured by a camera and another one of the videos is generated by a computer.

3. The cross-domain image comparison method according to claim 1, wherein in the step of obtaining the semantic segmentation areas, the semantic segmentation areas are obtained via a semantic segmentation model, and the semantic segmentation model is a Fully Convolutional Networks model (FCN model), an U-net model or an efficient neural network model (Enet model).

4. The cross-domain image comparison method according to claim 1, the step of obtaining the similarity between the frames includes:
averaging a position similarity degree of the ROI pair, an angle similarity degree of the ROI pair, a size similarity degree of the ROI pair and a contour similarity of the ROI pair with weightings, to obtain the similarity between the frames.

5. The cross-domain image comparison method according to claim 4, wherein the step of obtaining the similarity between the frames further includes:
analyzing an Euclidean distance between the central points, to obtain the position similarity degree of the ROI pair.

6. The cross-domain image comparison method according to claim 4, wherein the step of obtaining the similarity between the frames further includes:
analyzing a relative angle between the bounding boxes, to obtain the angle similarity degree of the ROI pair.

7. The cross-domain image comparison method according to claim 4, wherein the step of obtaining the similarity between the frames further includes:
analyzing a diagonal length of each of the bounding boxes, to obtain the size similarity degree of the ROI pair.

8. The cross-domain image comparison method according to claim 4, wherein the step of obtaining the similarity between the frames further includes:
analyzing two counters of the semantic segmentation areas corresponding the ROI pair, to obtain the contour similarity degree.

9. The cross-domain image comparison method according to claim 8, wherein the counters are resized to be identical size.

10. The cross-domain image comparison method according to claim 1, wherein the two semantic segmentation areas corresponding the ROI pair are obtained from the two different videos.

11. A cross-domain image comparison system, comprising:
an inputting unit, used for obtaining two videos in cross-domain, wherein the videos are generated by different types of devices;
a semantic segmentation unit, used for obtaining a plurality of semantic segmentation areas from one frame of each of the videos;
a ROI unit, used for obtaining a region of interest pair (ROI pair) according to moving paths of the semantic segmentation areas in the videos;
a bounding box unit, used for obtaining two bounding boxes and two central points of the bounding boxes, wherein each of the two bounding surrounds one of the semantic segmentation areas; and
a similarity unit, used for obtaining a similarity between the frames according to the bounding boxes and the central points.

12. The cross-domain image comparison system according to claim 11, wherein one of the videos is captured by a camera and another one of the videos is generated by a computer.

13. The cross-domain image comparison system according to claim 11, wherein the semantic segmentation unit obtains the semantic segmentation areas via a semantic segmentation model, and the semantic segmentation model is a Fully Convolutional Networks model (FCN model), an U-net model or an efficient neural network model (Enet model).

14. The cross-domain image comparison system according to claim 11, wherein the similarity unit includes:
a score calculator, used for averaging a position similarity degree of the ROI pair, an angle similarity degree of the ROI pair, a size similarity degree of the ROI pair and a contour similarity degree of the ROI pair with weightings, to obtain the similarity between the frames.

15. The cross-domain image comparison system according to claim 14, wherein the similarity unit further includes:
a position similarity analyzer, used for analyzing an Euclidean distance between the central points, to obtain the position similarity degree of the ROI pair.

16. The cross-domain image comparison system according to claim 14, wherein the similarity unit further includes:
an angle similarity analyzer, used for analyzing a relative angle between the bounding boxes, to obtain the angle similarity degree of the ROI pair.

17. The cross-domain image comparison system according to claim 14, wherein the similarity unit further includes:
a size similarity analyzer, used for analyzing a diagonal length of each of the bounding boxes, to obtain the size similarity degree of the ROI pair.

18. The cross-domain image comparison system according to claim 14, wherein the similarity unit further includes:
a contour similarity analyzer, used for analyzing two counters of the semantic segmentation areas corresponding the ROI pair, to obtain the contour similarity degree.

19. The cross-domain image comparison system according to claim 18, wherein the contour similarity analyzer resizes the counters to be identical size.

20. The cross-domain image comparison system according to claim 11, wherein the two semantic segmentation areas corresponding the ROI pair are obtained from the two different videos.

* * * * *